No. 630,072. Patented Aug. 1, 1899.
J. H. RATHBUN.
BICYCLE CRANK AND BEARING.
(Application filed Oct. 14, 1897.)

(No Model.)

Witnesses:
Geo. W. Young.
Chas. L. Goss.

Inventor:
John H. Rathbun,
By Winkler Flanders Smith Bottom &c.
Attorneys.

UNITED STATES PATENT OFFICE.

JOHN H. RATHBUN, OF MILWAUKEE, WISCONSIN.

BICYCLE CRANK AND BEARING.

SPECIFICATION forming part of Letters Patent No. 630,072, dated August 1, 1899.

Application filed October 14, 1897. Serial No. 655,166. (No model.)

*To all whom it may concern:*

Be it known that I, JOHN H. RATHBUN, of Milwaukee, in the county of Milwaukee and State of Wisconsin, have invented certain new and useful Improvements in Bicycle Cranks and Bearings; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to provide a rigid and secure connection between the crank-arms and axle, at the same time producing a light construction of neat symmetrical appearance, to provide for easy and accurate adjustment of the ball-bearings, to facilitate the removal of the axle from the hanger and access to the ball-bearings, to exclude dust and dirt from the bearings, and generally to improve the construction and operation of devices of this class.

It consists of certain novel features in the construction and arrangement of the crank-arms, axle, and bearings, as hereinafter particularly described, and pointed out in the claims.

In the accompanying drawings like letters designate the same parts in both figures.

Figure 1:
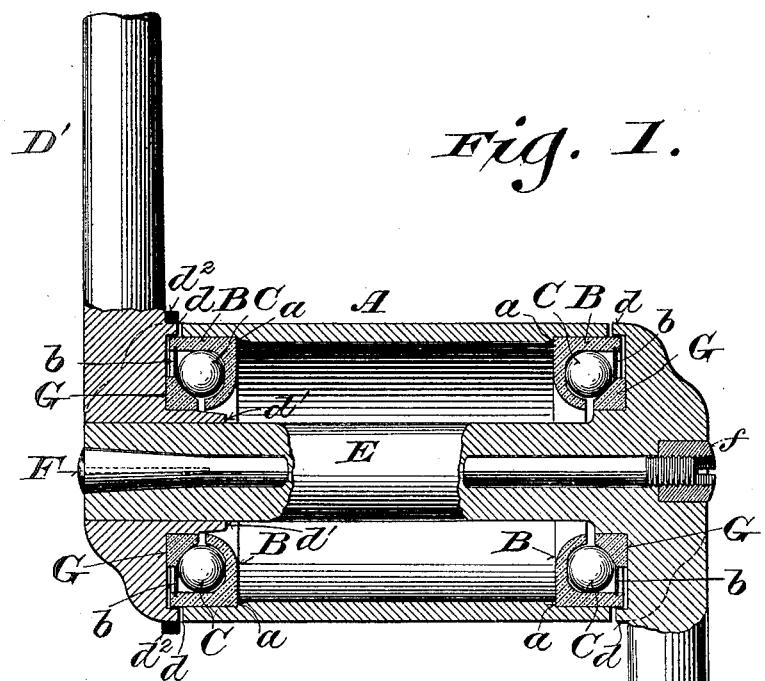
Figure 2:
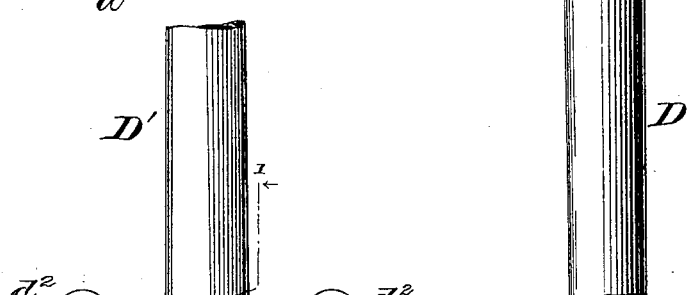

Figure 1 is an axial section of a crank-hanger, axle, and bearings embodying my improvements; and Fig. 2 is an end view of the same as viewed from the left with reference to Fig. 1.

A designates a tubular crank-hanger in the ends of which are fitted ball races or cups B B, abutting at their inner ends against internal shoulders $a$ $a$ and projecting at their outer ends beyond the ends of said hanger A. The ball-races are provided with washers $b$ $b$, sprung into internal grooves in their outer ends to hold the balls C C therein when the crank-axle, with the opposing bearings thereon, is removed.

D D' are the crank-arms formed on the inner faces of their hubs with annular flanges $d$ $d$ of the same internal diameter as the ends of the hanger A. The projecting ends of the ball-races B fit loosely inside of the flanges $d$ $d$, and with them and the washers $b$ $b$ serve to effectively protect the ball-bearings from dirt and dust.

E is a tubular axle formed at one end integrally with the crank-arm D and split at the opposite end, which is fitted to be expanded in the bore or hole of the crank-arm D'. The hole in this arm is elongated, as shown in Fig. 2, squared or otherwise shaped, so as to prevent the crank-arm from turning on the axle when the latter is expanded therein. The bore in the split end of the axle is made tapering or flaring, increasing in diameter outwardly toward the end of the axle.

F is a pin tapered at one end to fit the tapered bore of the axle, threaded at its opposite end, and provided with a nut $f$, which is preferably countersunk into the hub of arm D.

G G are cone-bearings fitted one upon the axle E next to the hub of arm D and the other upon an inwardly-projecting flange $d'$ on the hub of arm D', around the hole therein.

The hub of the arm D' is formed with a seat, flange, or ears $d^2$ $d^2$ for the attachment of the sprocket-wheel. To detach and remove the crank-arms and axle from the hanger and to gain access to the ball-bearings, the nut $f$ is removed or loosened and the pin F driven out of engagement with the split end of the axle, which is thus allowed to contract. The arm D' being thus released is easily withdrawn from the axle E, which can then be withdrawn from the hanger in the opposite direction with the arm D. The balls will be held in the hanger A by the washers $b$. Free access is thus had to the bearings for cleaning and repairing the same. The removal of the sprocket-wheel and the substitution of another of different size, which is often desirable, is also facilitated. When the parts are assembled, they are secured rigidly in place by driving the tapered pin F into and expanding the split end of the axle E, and the pin when driven into place is secured by screwing or tightening the nut $f$ thereon. The ball-bearings may be easily and quickly adjusted to take up wear and play by loosening the pin F, setting the detachable arm D' on axle E toward the other arm D, and then securing it in place on the axle, as hereinbefore explained.

My improved construction not only facilitates the removal of the cranks and axle, as well as access to and adjustment of the ball-bearings, but it is also easy and cheap to make and compact and symmetrical in design. The pin F being plain or smooth and extending through the axle from end to end can be driven in and out, the cones can be adjusted to take up play, and access can be readily had to the bearings for inspection and repairs without using special tools. The taper of the pin being gradual or of considerable length, as shown, will of itself hold it securely in place, and the nut $f$ may therefore be dispensed with, although as a safeguard against loss or accident it is perhaps advisable to retain it.

I do not wish to be understood as limiting myself to the exact details herein shown and described, as they may be variously modified within the spirit and intended scope of my invention.

I claim—

1. The combination of a crank-arm, a tubular axle rigidly attached at one end to said arm and split at the other end, a detachable crank-arm loosely fitted on the split end of said axle, and a pin having a plain taper for expanding the split end of said axle in said detachable arm and exposed when inserted in said axle at both ends thereof for driving it into and out of place, substantially as and for the purposes set forth.

2. The combination with a crank-hanger provided in its ends with ball-races, of a crank-arm, a tubular axle rigidly attached at one end to the hub of said arm and having its bore extending through said hub, the opposite end of said axle being split and having its bore increasing in diameter outwardly, a detachable crank-arm having a hole in its hub loosely fitted but so shaped as to prevent its turning upon the split end of said axle, a pin having a plain taper which is fitted to expand the split end of said axle in the hub of the detachable arm, and exposed when in place at both ends of the axle for driving it in and out, cones, one of which is adjustable with the detachable crank-arm, balls interposed between said cones and races, and means for retaining the balls in said races when the cones are removed, substantially as and for the purposes set forth.

In testimony that I claim the foregoing as my own I affix my signature in presence of two witnesses.

JOHN H. RATHBUN.

Witnesses:
MARY HAYES,
CHAS. L. GOSS.